UNITED STATES PATENT OFFICE.

JOHN C. SELLARS, OF BIRKENHEAD, ENGLAND.

CEMENT.

SPECIFICATION forming part of Letters Patent No. 633,618, dated September 26, 1899.

Application filed June 21, 1898. Serial No. 684,089. (No specimens.)

*To all whom it may concern:*

Be it known that I, JOHN CARRINGTON SELLARS, a subject of the Queen of Great Britain, and a resident of Birkenhead, Chester county, England, have invented certain new and useful Improvements in Cement, of which the following is a specification.

This invention has reference to the manufacture of cement for use in connection with apparatus or materials subjected to artificial heat generated by fire or hot fluids or the like; for use in the form of paint as a covering of iron and steel surfaces for their protection against corrosion, as for covering the plates of various parts of ships which it may be desired to protect and other steel or iron work on land; for use in steam-generators, and for similar and other purposes to which it may be usefully applied; and the invention has chiefly for its object to provide cements of the kind referred to and for purposes such as specified at an inexpensive rate, and to thereby enable their use for purposes such as described to be considerably extended or, at any rate, to enable them to be used and applied at considerably less cost than heretofore.

According to this invention the base of the cement consists of the combination of bauxite and silicate of soda, and preferably in or about the proportion of one part, by weight, of the latter to four of the former. This compound I find when heated artificially even at comparatively low temperature soon sets and becomes hard and adheres strongly and does not crack, and it is, moreover, insoluble, even in hot water.

According to one mode of manufacture silicate of soda in or about the proportion specified is added to bauxite in a natural state and then it is allowed to stand for a short time. It is then ground or pounded to a fine powder, and the two substances become thoroughly mixed and are brought to the condition of a plastic substance or putty. In this condition it is serviceable for repairing vessels or chambers subjected to artificial heat, as fire heat; for making joints in such things or filling cracks or holes or repairing same, and generally where a material having the qualities and characteristics of such a cement is required.

In another mode of making the cement the bauxite is soaked in silicate of soda, and after withdrawal the excess of silicate of soda is drained off. The compound is then ground or pounded, as before specified, and it possesses the same characteristics as that made in the manner just specified.

When cement is required to set extra quickly or under water, there is combined with it a proportion of Portland cement. For instance, in the case of cement being required for use in the inside surface of steam-generators, where it is subjected to hot water, the compound may consist of two parts, by weight, of the combined bauxite and silicate of soda and one part of Portland cement; but, as stated, the simple mixture of bauxite and silicate of soda will of itself resist the action of hot water after being artificially heated, but does not set so rapidly as that containing Portland cement. If this compound cement is used under water or for purposes subjected to wet, the two portions of which it is composed may be in the proportion of one to one.

In a cement according to this invention in a condition most suitable as a paint for covering or painting iron or steel structures or surfaces water is mixed and combined with the bauxite and silicate of soda cement above described, in the proportion of about three parts of water to one of cement, and to this mixture there is further added one part of Portland cement to twelve of the mixture of cement and water. The product is a paint capable of being applied by the brush. This paint may be allowed to dry or harden of itself, which will be accomplished in a comparatively short time; or the hardening may be hastened by the application of artificial heat, as by a lamp-flame or flame-jets, or other suitable heating means or by heating the metal itself.

As regards the proportions herein specified, these may be used with advantage; but they can be varied within reasonable limits without departing from the essential characteristics of the invention.

According to another method of making up the cement material the bauxite is soaked in water, then drained and ground or pounded, and then the resultant material is made into bricks, which are then air-dried and finally soaked in or have added to them silicate of soda.

What is claimed is—

A cement for the purposes as described comprising in combination bauxite and silicate of soda in proportions, as specified, substantially as set forth.

In witness whereof I have hereunto set my hand in presence of two witnesses.

JOHN C. SELLARS.

Witnesses:
JOHN H. WALKER,
JNO. W. BROWN.